(12) United States Patent
Matsushita et al.

(10) Patent No.: US 8,740,180 B2
(45) Date of Patent: Jun. 3, 2014

(54) ROTARY VALVE

(75) Inventors: Hiroyuki Matsushita, Nobeoka (JP); Tomoki Matsui, Nobeoka (JP)

(73) Assignee: Asahi Organic Chemicals Industry Co., Ltd., Miyazaki (JP)

( * ) Notice: Subject to any disclaimer, the term of this patent is extended or adjusted under 35 U.S.C. 154(b) by 916 days.

(21) Appl. No.: 12/084,347

(22) PCT Filed: Feb. 20, 2007

(86) PCT No.: PCT/JP2007/053005
§ 371 (c)(1),
(2), (4) Date: Apr. 29, 2008

(87) PCT Pub. No.: WO2007/108267
PCT Pub. Date: Sep. 27, 2007

(65) Prior Publication Data
US 2009/0261280 A1    Oct. 22, 2009

(30) Foreign Application Priority Data

Mar. 20, 2006 (JP) ................... 2006-076817

(51) Int. Cl.
*F16K 35/02* (2006.01)
*F16K 35/10* (2006.01)
*F16K 31/00* (2006.01)
*F16K 11/08* (2006.01)
*F16K 5/00* (2006.01)

(52) U.S. Cl.
USPC ............. 251/109; 251/91; 251/93; 251/95; 251/286; 251/292; 137/269; 137/385; 70/177; 70/180

(58) Field of Classification Search
CPC ............ F16K 5/00; F16K 5/08; F16K 31/00; F16K 31/041; F16K 35/02; F16K 35/022; F16K 35/025; F16K 35/06; F16K 35/10; F16K 11/08

USPC ......... 251/90, 91, 93, 95, 101, 111, 254, 286, 251/288, 92, 107, 108, 109, 284, 291, 292; 70/175, 177, 179, 180, 183, 186, 176, 70/182; 137/385, 269

See application file for complete search history.

(56) References Cited

U.S. PATENT DOCUMENTS 304,874 A * 9/1884 Thompson ...................... 184/86
620,124 A * 2/1899 Hassis ........................... 137/555

(Continued)

FOREIGN PATENT DOCUMENTS

EP    1 460 321       9/2004
FR    2756034    *  5/1998

(Continued)

*Primary Examiner* — John K Fristoe, Jr.
*Assistant Examiner* — Jonathan Waddy
(74) *Attorney, Agent, or Firm* — Jordan and Hamburg LLP

(57) ABSTRACT

A conventional rotary valve in which is provided with a locking mechanism for fixing the degree of aperture so as to prevent misoperation and reduce accidents caused thereby, and even a previously installed valve can be converted to a valve having a locking mechanism, simply by replacing the handle alone. In a rotary valve wherein a valve element that is engaged with a stem is turned by turning the stem, which is connected to a handle, so as to open and close the valve, and having a top flange that is provided on a neck of a valve body that supports the stem, a notch is formed at the peripheral edge of the top flange, and a locking member, having a protrusion that can be latched in the notch in the top flange by way of a torsion spring, is pivotably supported at the center of the handle or on a grip portion thereof.

11 Claims, 19 Drawing Sheets

(56) References Cited

U.S. PATENT DOCUMENTS

| | | | | |
|---|---|---|---|---|
| 757,652 A * | 4/1904 | Edwards | ........................ | 251/93 |
| 944,026 A * | 12/1909 | Fowden | ................... | 137/556.3 |
| 1,014,203 A * | 1/1912 | Bees | ............................. | 70/180 |
| 1,075,798 A * | 10/1913 | Wait | ............................ | 251/109 |
| 1,115,792 A * | 11/1914 | Drew | ............................ | 70/180 |
| 1,185,719 A * | 6/1916 | Rogers | ........................... | 251/95 |
| 1,618,307 A * | 2/1927 | Pieczonka | ...................... | 251/93 |
| 1,671,594 A * | 5/1928 | Kohlmann | ...................... | 251/90 |
| 4,126,023 A * | 11/1978 | Smith et al. | .................... | 70/177 |
| 4,193,320 A * | 3/1980 | Oota | ............................... | 74/535 |
| 4,253,690 A | 3/1981 | Hollander | | |
| 4,348,006 A * | 9/1982 | Schmitt et al. | ................ | 251/288 |
| 4,747,427 A * | 5/1988 | Smith et al. | .................. | 137/270 |
| 4,890,506 A * | 1/1990 | Muller | ........................... | 74/523 |
| 4,890,814 A * | 1/1990 | Thomas | ......................... | 251/95 |
| 5,222,382 A * | 6/1993 | De Vizzi | ......................... | 70/212 |
| 5,244,008 A * | 9/1993 | Bauer | .......................... | 137/385 |
| 5,294,091 A * | 3/1994 | van Eck | .......................... | 251/95 |
| 5,551,265 A * | 9/1996 | Garman et al. | ................. | 70/177 |
| 5,553,831 A * | 9/1996 | Ozaki et al. | .................... | 251/292 |
| 5,564,461 A * | 10/1996 | Raymond et al. | ........ | 137/315.35 |
| 5,839,304 A * | 11/1998 | Wills | .............................. | 70/175 |
| 6,038,893 A * | 3/2000 | Neeley et al. | ................... | 70/175 |
| 6,260,819 B1 | 7/2001 | Ovsepyan | | |
| 6,676,109 B2 * | 1/2004 | Gomi et al. | ................... | 251/288 |
| 6,959,909 B2 * | 11/2005 | Bancroft et al. | .............. | 251/109 |

FOREIGN PATENT DOCUMENTS

| | | |
|---|---|---|
| JP | 8-303637 | 11/1996 |
| JP | 9-217858 | 8/1997 |
| JP | 11-311356 | 11/1999 |

* cited by examiner

Prior Art

Prior Art

ROTARY VALVE

BACKGROUND OF THE INVENTION

The present invention relates to rotary valves used in fluid transport pipelines in the semiconductor industry, the biopharmaceutical industry, the food industry or in other chemical industries; more specifically, it relates to a rotary valve in which the degree of aperture can be fixed by a locking mechanism, whereby misoperation can be prevented, the locking mechanism being compact and requiring little space, so that even if the valve is mounted in small spaces, there is no impediment to turning the handle, whereby a single valve body can easily be converted to one that has a locking mechanism or to one that does not have a locking mechanism, by replacing the handle alone, and whereby, in a rotary valve having at least three flow paths, opening, closing and switching of flow paths can be maintained locked at reliable switching positions.

Conventional rotary valves often did not have locking mechanisms and, in order to prevent operation in such cases, methods were employed such as installing warning signs, removing the handle, fixing the handle in place with string or wire, or providing a cover.

Furthermore, valves having handle locking mechanisms were structurally specialized, as they required that the valve body have a special structure, such as that shown in FIG. 18. This valve is an on-off valve having a structure in which: opening and closing is controlled by rotationally operating a valve element by way of a valve stem 103, as result of turning a handle lever 101 in a direction X; a locking plate 102, which turns in a direction Y, in a plane substantially perpendicular to the direction X in which the handle lever 101 turns, is pivotably supported on the upright section of the handle lever 101; and the valve is locked open or closed as a result of latching the locking plate in a latch lock 104, by way of the spring force of a tensioning spring 105, which is mounted under tension between the handle lever 101 and the locking plate 102 (For example, see Patent Reference 1).

Furthermore, the rotary valve shown in FIG. 19 is an on-off valve in which opening and closing of the valve is controlled by turning a handle 107, and which is structured so that the valve is locked open or closed by engaging a protrusion 110, at the inner part of the bottom of the handle 107, and a notch 111, which is provided on the neck of the valve body 112, wherein by pulling up an engaging member 108 at the bottom of the grip of the handle 107, the aforementioned engagement is released, so that the handle 107 turns and the valve is opened or closed; furthermore, this can be maintained locked by inserting a cylinder lock or the like into a hole 109 (For example, see Patent Reference 2).

Patent Reference 1: JP-08-303637-A (pp. 1-6, FIG. 1)
Patent Reference 2: U.S. Pat. No. 6,260,819 (pp. 1-7. FIG. 1)

However, with the valve shown in FIG. 18, because the latch lock 104 must be provided on the valve sleeve 106, it is difficult to provide the latch lock 104 as part of follow up work, so that it is not possible to install the locking mechanism on existing valves that do not have a latch lock 104; thus, if one wished to use valves that had been already installed on pipes as valves having open/closed locking mechanisms, the valves would have to be removed from the pipes and replaced with valves equipped with locking mechanisms. Furthermore, there was a problem in so much as the structure did not readily allow the locking plate 102 to be fastened in the locked state with a cylinder lock or the like, and therefore this was not suited to installation in places where any number of people could touch it.

Next, with the rotary valve shown in FIG. 19, there are problems in so much as a specialized valve body is required, on which the notch 111 is provided for use in the locking mechanism; and because the specialized handle that has the engaging member 108 is elongated in the valve stem direction, it is difficult to install this in small spaces.

Furthermore, in the rotary valve having the locking mechanism described above, because the notch 111 must be provided on the valve body 112, it may be difficult to provide the notch 111 as part of follow up work, and therefore the locking mechanism can not be installed on existing valves that do not have the notch 111; thus, if one wished to use valves that had been installed on pipes as valves having open/closed locking mechanisms, the valves would have to be removed from the pipes and replaced with valves having locking mechanisms; consequently, it would not be possible to perform the replacement work without temporarily stopping the flow of the fluid within the pipes; furthermore, because the valve is larger than one having a conventional handle that does not include a locking mechanism, there was a problem in that this could not easily be used for replacements in places where there was little space for valve installation.

SUMMARY OF THE INVENTION

The present invention is a reflection of the problems in the prior art described above, and an object thereof is to provide a rotary valve, which allows for a reduction in accidents resulting from misoperation, by making it possible to fix the degree of aperture of previously manufactured rotary valves by providing these with a locking mechanism, so as to prevent misoperation, with which turning of the handle is not impeded, even if the valve is mounted in a small space, because the locking mechanism is compact and requires little space, whereby even previously installed valves can be converted so as to have locking mechanisms, simply by changing the handle alone, and whereby, in a rotary valve having at least three flow paths, opening, closing and switching of flow paths can be maintained locked at reliable switching positions.

DETAILED DESCRIPTION OF THE INVENTION

Figure 1:
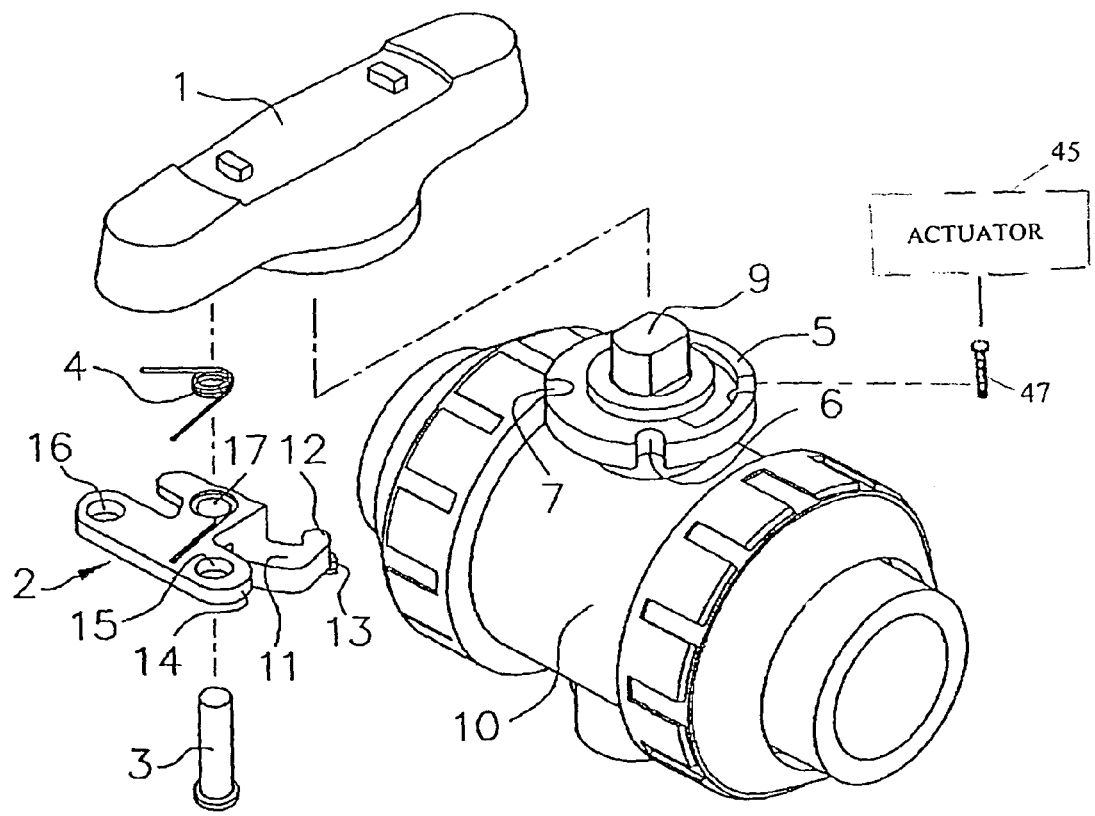
FIG. 1 is an exploded perspective view of a ball valve constituting a first mode of embodiment of the rotary valve according to the present invention.

Describing the constitution of the rotary valve of the present invention, which is directed at solving the aforementioned problems, with reference to the drawings, a first aspect is a rotary valve in which a valve element that is engaged with a stem 9 is turned by turning the stem 9, which is connected to a handle 1, so as to open and close the valve, and having a top flange that is provided on a neck of a valve body 10 that supports the stem 9, wherein a latch receiving part is formed at the peripheral edge of the top flange, and a locking member 2, having a latch part that can be latched in the latch receiving part by way of a biasing member, is pivotably supported at the center of the handle 1 or on a grip portion thereof.

A second aspect is a rotary valve having at least three flow paths, in which a valve element 29 that is engaged with a stem 9 is turned by turning the stem 9, which is connected to a handle 1, so as to open and close the valve and/or switch the communicating flow paths, and having a top flange 5 that is provided on a neck of a valve body 28 that supports the stem 9, wherein a latch receiving part is formed at the peripheral edge of the top flange 5, and a locking member 2, having a latch part that can be latched in the latch receiving part by way of a biasing member, is pivotably supported at the center of the handle 1 or on a grip portion thereof.

A third aspect is that the locking member 2 turns so as to latch in a horizontal direction; and a fourth aspect is that the top flange 5 is formed integrally with the neck of the valve body 28.

A fifth aspect is that the biasing member is integral with the locking member 2 or fastened to the locking member 2; and a sixth aspect is that the biasing member is a spring.

A seventh aspect is that, in a rotary valve in which a through groove is provided for a bolt that fastens an actuator to the top flange 5, the through groove is used as the latch receiving part.

An eighth aspect is that a lever 14 is provided on the locking member 2, so as to protrude to a position exterior to the lateral face of the handle 1 when the latch part is engaged in the latch receiving part, and a securing hole 15 is provided in the lever 14.

A ninth aspect is that the biasing means is a torsion spring 4, one end of which is fitted in the locking member 2 and the other end of which is fitted in the handle 1, and which, together with the locking member 2, is pivotably supported on the handle 1 by way of a pin 3, so that the latch part of the locking member 2 engages in the latch receiving part of the top flange 5 as a result of the biasing force thereof; and a tenth aspect thereof is that the biasing means is a flat spring 19, the flat spring 19 being provided integrally with the locking member 2 so that the latch part of the locking member 2 engages in the latch receiving part of the top flange 5 as a result of the biasing force thereof.

An eleventh aspect thereof is that the rotary valve is a two-way valve, a three-way valve or a four-way valve, having a spherical or cylindrical valve element, or a butterfly valve.

A twelfth aspect thereof is that a no-latch hole 16 is provided at a position opposite a securing hole 15 in the lever 14; and a thirteenth aspect thereof is that a flange 13 for preventing detachment of the handle 1, which engages with the bottom face of the top flange 5, extends from the bottom of the latch part.

In the present invention, the term "lock" refers to fixing the handle 1 in place.

The rotary valve of the present invention may be configured so that a valve having a bidirectional flow path is opened and closed, or may be configured so that a valve having flow paths in at least three directions is opened and closed and/or the communicating flow paths are switched. The rotary valve may be a two-way valve, a three-way valve or a four-way valve (a ball valve or a cock) having a spherical or cylindrical valve element, or it may be a butterfly valve. A rotary valve in which the valve element is spherical or cylindrical, such as a ball valve or a cock, is particularly preferred because the rotary torque on the stem 9 is relatively low, and thus a small handle 1 can be provided; being compact, even a small handle 1 will not be obstructed, and if an attempt is made to turn the handle 1 when the degree of aperture has been locked, the interlocking parts of the locking member 2 and the top flange 5 are not subjected to large loads.

In the present invention, the biasing member and the locking member 2 may be integral or may be fastened together.

In the present invention, the biasing member may be a spring; and while there are no particular restrictions on this, a torsion spring 4 and a flat spring 27 are preferred. The torsion spring 4 is preferred because it is easy to rotationally bias the locking member 2 around the axis of the pin 3, by which the locking member 2 is pivotably supported on the handle 1, and assembly is also easy. The flat spring 27 is preferred, because, by providing this integrally with the locking member 2, the number of parts can be reduced and assembly labor can be minimized.

In the present invention, it is preferable that the rotary valve have a configuration wherein the locking member 2 turns in a horizontal direction so that the latch part latches in the latch receiving part. This is preferred because: a locking mechanism that turns in the horizontal direction is easy to assemble and requires few parts; the locking mechanism can be provided in a compact manner; since it turns in a horizontal direction, parallel to the handle 1, it does not block the operation of opening and closing the valve; and the turning of the locking member 2 does not impede the turning of the handle 1, particularly in small spaces.

In the present invention, the top flange 5 is preferably formed integrally with the valve body 10. This is preferred because the strength of both the top flange 5 and the valve body 10 is greater when these are formed integrally than when they are not integral, allowing damage and deformation to be prevented, even if stress is applied to the latch receiving part of the top flange 5 when the degree of aperture of the valve is locked by way of the locking mechanism, in addition to which, the number of parts is reduced and valve assembly labor is minimized.

In the present invention, the rotary valve is provided with through grooves for bolts that fasten an actuator 45 on the top flange 5 for operating the valve as an automatic valve, and these through grooves are preferably used as the latch receiving parts when the valve is operated as a manual valve through use of the handle. The through grooves pass vertically through the top flange 5 so as to form cutaway grooves in the side face of the top flange 5, corresponding to the notches 6, 7 in FIG. 1. The through grooves are provided in advance on the top flange 5 of the rotary valve, and when the actuator is mounted on the rotary valve, bolts 47 are passed through the through grooves, and the bolts are fixed in place so that the actuator is installed at the top of the stem 9; but when the handle 1 is mounted, the through grooves are not used. By using the through grooves as the latch receiving parts, it is not necessary to provide additional latch receiving parts on an existing valve that has been provided with through grooves, and thus the valve can easily be converted to a valve with a locking mechanism or a valve without a locking mechanism, simply by replacing the handle 1. Consequently, if one wishes to use a valve that has been installed on a pipe as a valve having a locking mechanism, it is possible to convert the valve to a valve having a locking mechanism, without the flow of the fluid having to be stopped, and without removing the valve from the pipe and replacing it, which is advantageous.

Furthermore, in a rotary valve having at least three flow paths, it is preferable that the latch receiving parts be provided on the top flange 5, so that the latch part on the locking member 2 can latch the handle 1 at switching positions at which the valve element 29 opens and closes the valve and/or switches the communicating flow paths.

This is desirable because, with three-way valves or a four-way valves, the handle 1 was rotatable through 360° of freedom, and workers opened or closed the valve, or switched the communicating flow paths, by positioning the handle 1 at a switching position, but the manner in which this was aligned with the switching position varied depending on the worker, and if this was not aligned at the correct switching position, the fluid could be reliably stopped and downstream leakage occurred, or 100% flow path aperture was not achieved; but by virtue of the constitution of the present invention, in which the handle 1 can be locked at the handle 1 switching positions, it is possible to prevent workers from aligning the handle 1 at inaccurate switching positions, and the degree of aperture can be locked, so as to prevent misalignment with the switching position.

Figure 16:
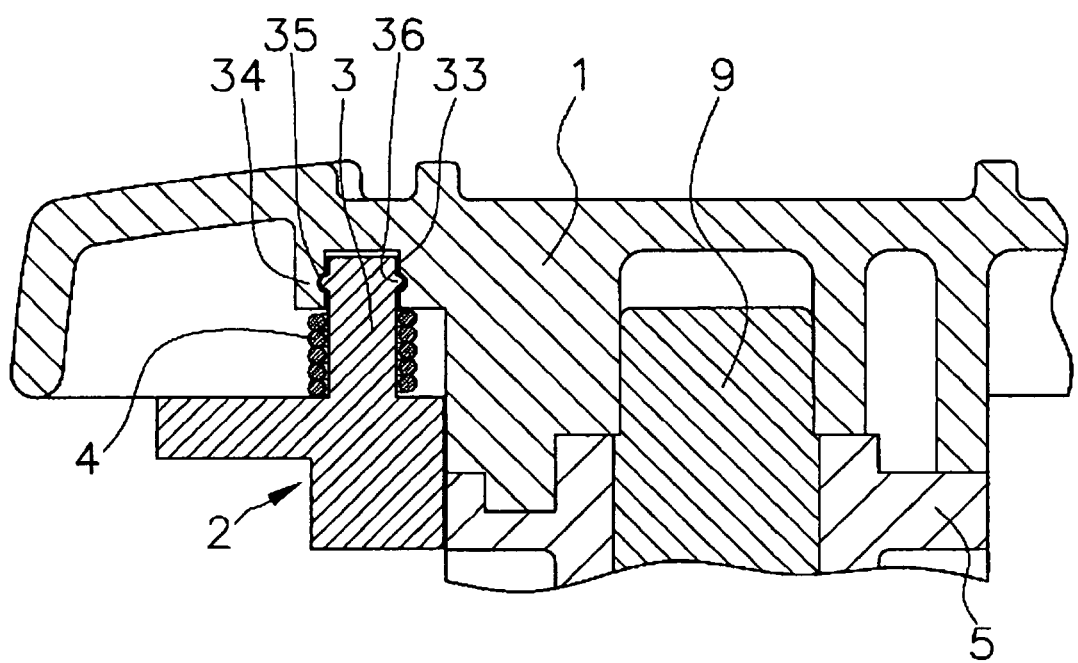
FIG. 16 is an enlarged longitudinal sectional view of a relevant portion, showing a method of fastening the locking member.

There are no particular restrictions on the method of attaching the locking member 2 of the present invention, so long as this is pivotably supported on the central portion, or the grip portion, of the handle 1; but preferred methods include fastening the locking member 2 to the bottom of the grip portion of the handle 1 with a pin 3. The pin 3 may be provided separately from the locking member 2 (see FIG. 1) or may be provided integrally therewith (see FIG. 16). If the pin 3 and the locking member 2 are integrally provided, in order for the locking member 2 to turn, it is necessary to fasten the pin 3 in the handle 1 rotatably and, for example, as shown in FIG. 16, a boss 34 having an insertion hole 33 is formed on the grip portion of the handle 1, an annular recess 35 is provided at the inner circumference of the insertion hole 33, an annular protrusion 36 is provided at the upper outer circumference of the pin 3, and by forcefully inserting the upper portion of the pin 3 into the insertion hole 33, the annular protrusion 36 on the pin 3 is caused to engage in the annular recess 35 in the insertion hole 33, whereby the locking member 2 can be rotatably fastened so as not to detach from the handle 1. Furthermore, if the pin 3 and the locking member 2 are separately provided, the locking member 2 can rotate, regardless of the manner in which the pin 3 and the handle 1 are fastened, and in terms of fastening methods: the upper portion of the pin 3 may be snugly fitted into an insertion hole in a boss that is provided on the grip portion of the handle 1 (not shown); threading may be provided at the outer circumference of the upper portion of the pin 3 and at the inner circumference of the insertion hole, respectively, and these may be screwed together (not shown); these may be secured by way of adhesion or fusing; or these may be secured by a method such as shown in FIG. 16.

Vinyl chloride resin (hereafter referred to as PVC) is often used as the material for the top flange 5, the stem 9 and the valve body 10 of the rotary valve according to the present invention, but there are no particular restrictions on this, and so long as the strength and properties thereof satisfy the requirements of the rotary valve, this may be a synthetic resin such as polypropylene resin (hereinafter referred to as PP) or polyvinylidene fluoride (hereafter referred to as PVDF) or a metal such as copper, cast iron or cast steel.

Furthermore, an acrylonitrile-butadiene-styrene copolymer (hereafter referred to as ABS) is commonly used as the material for the locking member 2 of the rotary valve according to the present invention, but this may also be PP or metal.

Furthermore, ABS is commonly used as the material for the pin 3 in the rotary valve according to the present invention, but this may also be PVC; and ABS is commonly used as the material for the flat spring, but this may also be PP or metal.

Hereafter, preferred modes of embodiment of the present invention are described with reference to the embodiments shown in the drawings, but it is a matter of course that the present invention is not limited to these embodiments.

Hereafter, a ball valve, which constitutes a first embodiment of the rotary valve according to the present invention, is described with reference to FIG. 1 through FIG. 5. In this embodiment, a hook part is used, which constitutes the latch part.

Embodiment 1

In the drawings, 1 is a handle made of ABS resin. At the center of the bottom face, a fitting slot is formed, into which a stem 9 fits.

Reference numeral 2 indicates an ABS locking member. A through hole 17 is provided at the rotational center thereof and, as centered on the through hole 17, in one radial direction, a substantially L-shaped hook part 11 is integrally provided, while in another radial direction, a lever 14 is integrally provided.

A protrusion 12 is provided on the hook part 11, and a detachment preventing flange 13 extends from the bottom thereof. A securing hole 15 is provided in the lever 14, and a no-latch hole 16 is provided at a position opposite the securing hole 15. The locking member 2 is fastened, by an ABS pin 3, which passes through the through hole 17, on the bottom face of the grip part of the handle 1, with a torsion spring, which is described hereafter, therebetween, so as to be pivotably supported on the handle 1. In this embodiment, the locking member 2 is fastened to the bottom face of the grip portion of the handle 1 by the pin 3, but this may be pivotably supported on the handle 1 by fastening it to the center of the handle 1.

Reference numeral 4 indicates an SUS-steel torsion spring. One end of the torsion spring 4 fits into the lock member 2, and the other end engages with the bottom of the grip portion of the handle 1.

Reference numeral 5 indicates a circular PVC top flange, at the peripheral edge of which, notches, which serve to engage the protrusion 12 on the locking member 2, are provided in 4 places, at central angle intervals of 90°. These notches can be used as through grooves for bolts when the handle 1 is removed and an actuator is fastened to the top flange 5. By further providing an additional notch 8 between two adjacent notches 6, 7, it is also possible to establish a locked state at an intermediate degree of aperture, at a central angle of less than 90° (see FIG. 4). That is to say, by providing an additional notch 8 at an arbitrary position between two adjacent notches 6, 7, it is also possible to establish a locked state at an arbitrary degree of aperture.

Reference numeral 9 indicates a PVC stem.

Reference numeral 10 indicates a PVC valve body. Openings are provided at both ends of the valve body 10, and the top flange 5 is integrally provided at the neck. A spherical valve element is provided within the valve body 10, so that the valve is opened and closed by turning the stem 9.

In this embodiment, a notch 6 is provided in the top flange 5, while a protrusion 12 is provided on the locking member 2, so that these engage; but a protrusion may be provided on the top flange 5 while a notch is provided on the locking member 2 so that these engage.

Next, a method is described for converting a rotary valve from a rotary valve that does not have a locking mechanism to a rotary valve that has the locking mechanism of this embodiment. If the configuration is such that, as in this embodiment, through grooves are already provided on the top flange 5 for the actuator fastening bolts, these through grooves can be used as engagement notches and, therefore, the conversion can be performed simply by removing a handle 1 that does not have a locking mechanism and mounting the handle 1 of this embodiment, which does have a locking mechanism.

Furthermore, even with a configuration wherein there are no notches 6 in the top flange 5, this work can easily be performed, as it suffices to provide notches in the top flange 5, which allow for engagement. Furthermore, the locking mechanism in this embodiment can easily be assembled simply by installing the torsion spring 4 and the locking member 2 on the handle 1, and fastening this with the pin 3, so that the torsion spring 4 can bias the locking member 2.

Next, the operation of the rotary valve in this embodiment is described.

Figure 2:
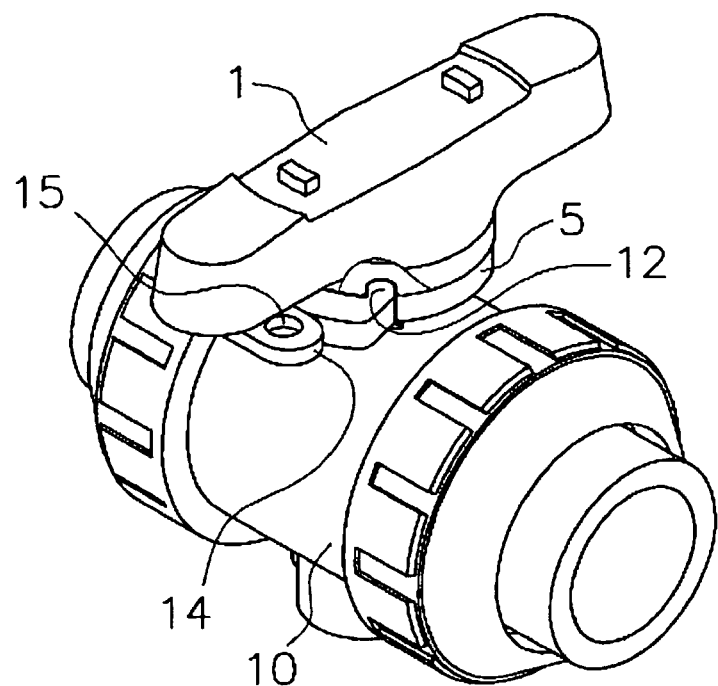
FIG. 2 is a perspective view showing the first mode of embodiment in the locked state, when fully closed.
Figure 3:
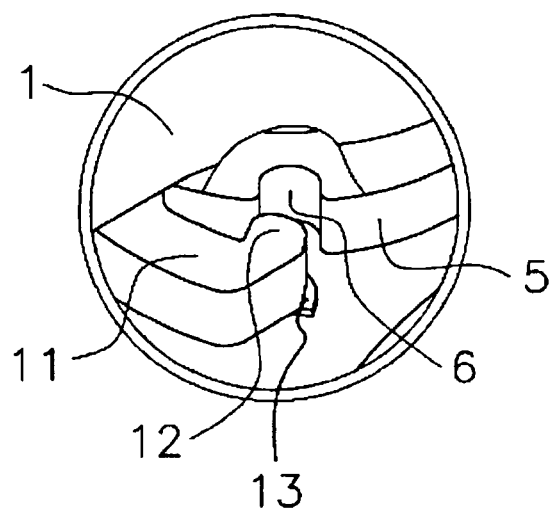
FIG. 3 is an enlarged view of a relevant portion, showing the first mode of embodiment prior to locking.
Figure 4:
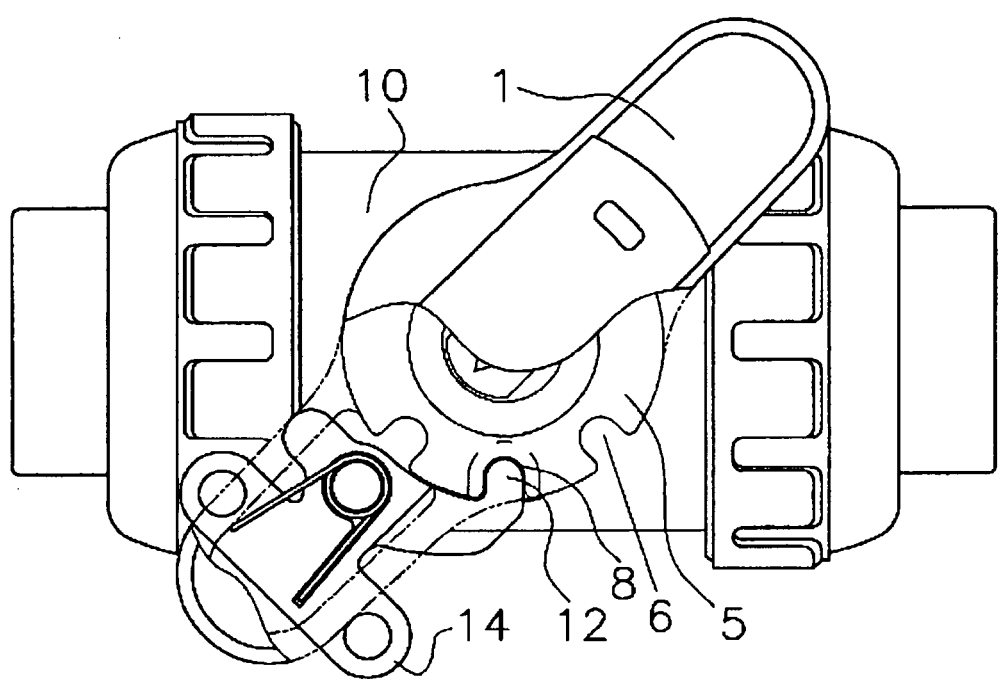
FIG. 4 is a plane view showing the first mode of embodiment in the locked state, when at an intermediate degree of aperture.

FIG. 2 shows the situation when the handle 1 is locked with the rotary valve closed. In this state, the handle is locked, because the protrusion 12 on the locking member 2 is engaged in the notch 6 on the top flange 5. Describing the method of releasing the lock on the handle 1 with reference to FIG. 1 through FIG. 4, if the lever 14 on the locking member 2 is pushed so as to turn clockwise around the pin 3, the protrusion 12 on the locking member 2 on the handle 1, which is engaged in the notch 6, is disengaged from the notch 6. If the handle 1 is then rotated through 90°, the rotary valve is opened. Thereafter, if the lever 14, which is being pressed, is released, the protrusion 12 on the locking member 2 moves to, and engages with, the notch 7, which is adjacent to the notch 6, so that the handle 1 is locked with the rotary valve open. At this point, because the configuration is one wherein the protrusion 12 latches in the notch 6 as a result of the small flat locking member 2 turning in a horizontal direction, the action takes place with the locking member 2 almost entirely hidden by the handle 1, which is to say that the configuration is extremely compact, so that there is no impediment to turning the handle 1, even if the valve is mounted in a small space.

The detachment preventing flange 13, which extends from the bottom of the hook 11, engages under the bottom face of the top flange 5 when the protrusion 12 on the hook 11 is engaged in the notch 6 in the top flange 5, so as to prevent the handle 1 from detaching.

Figure 5:
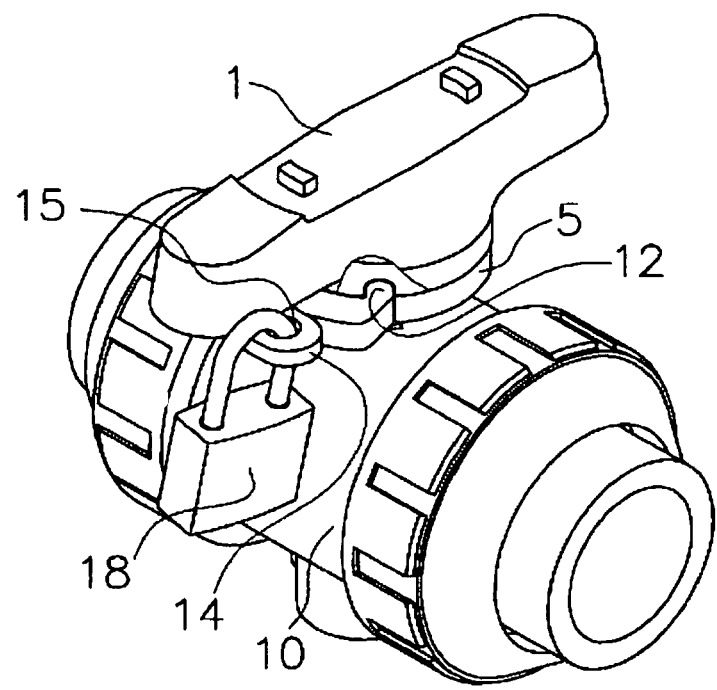
FIG. 5 is a perspective view showing the first mode of embodiment when locked fully closed with a cylinder lock inserted in the securing hole.

Furthermore, if a cylinder lock 18 is secured in the securing hole 15 when the rotary valve is locked fully open, fully closed or at a specific aperture, it is impossible for people to perform opening or closing operations with the handle 1 (see FIG. 5).

Figure 6:
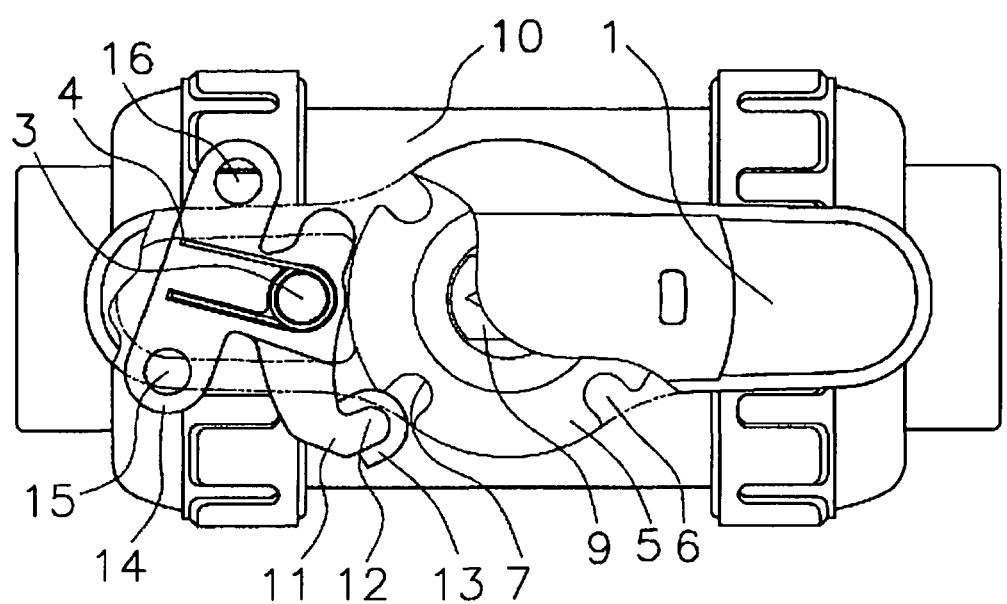
FIG. 6 is a plane view showing the first mode of embodiment in the locked state, when fully open.

Meanwhile, by securing the lever 14 by fitting a cylinder lock 18 in the no-latch hole 16, this is fixed so that the protrusion 12 on the hook 11 is disengaged from the notch 6 in the top flange 5, so that this is unlocked, and operation is possible in the same manner as with an ordinary handle 1 that does not have a locking mechanism (see FIG. 6).

In this embodiment of the rotary valve, a cylinder lock 18 is fitted in the securing hole 15, but there are no particular restrictions on this, so long as this provides a securing function.

Furthermore, in Embodiment 1, the rotary valve may have a cock structure (not shown) rather than a ball valve structure. If this has a cock structure, the configuration and operation are the same as in Embodiment 1, other than the fact that the shape of the valve element is cylindrical, and therefore no description is given.

Embodiment 2

Figure 7:
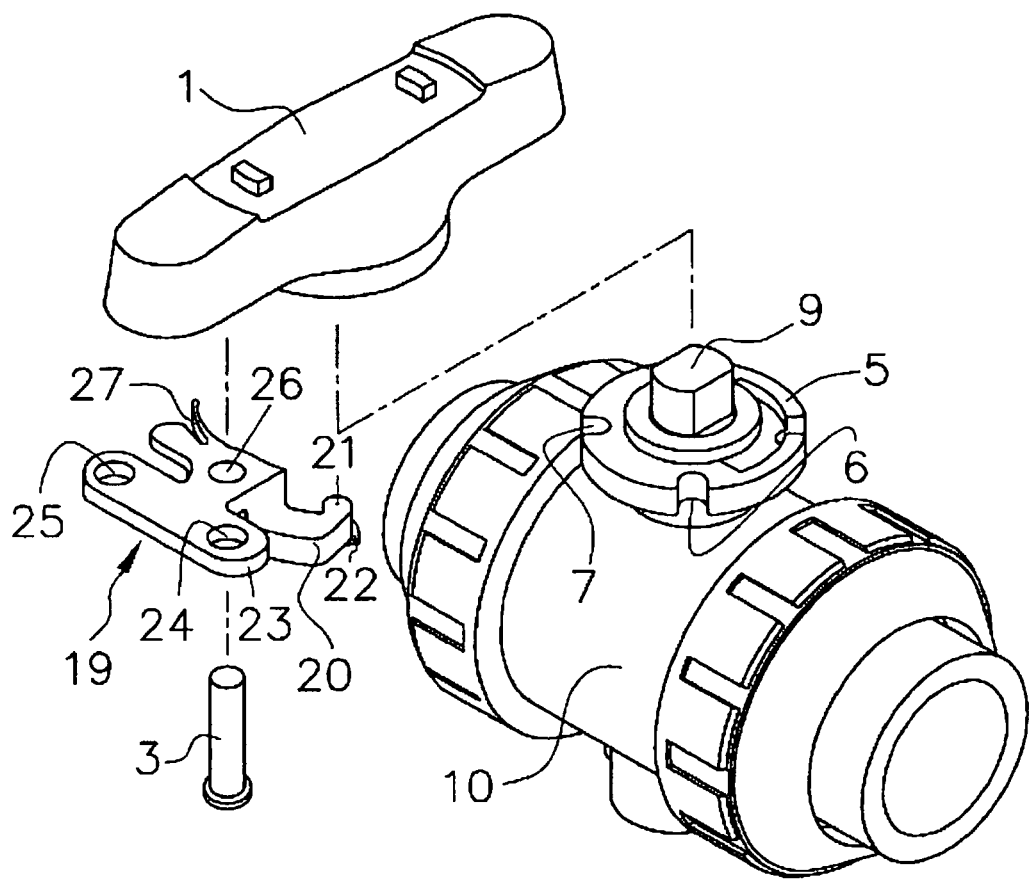
FIG. 7 is an exploded perspective view of a ball valve constituting a second mode of embodiment of the rotary valve according to the present invention.
Figure 8:
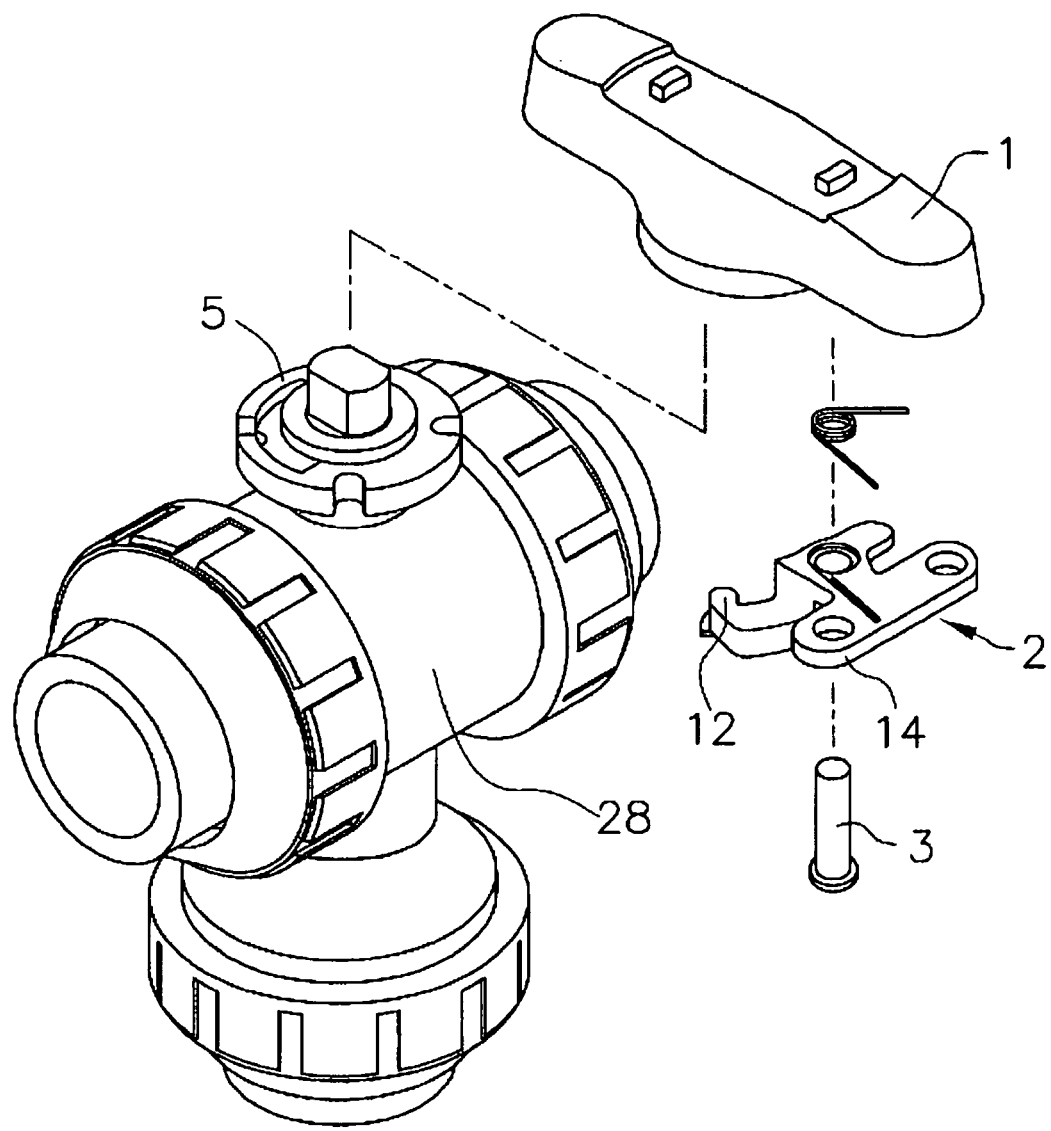
FIG. 8 is an exploded perspective view of a three-way ball valve constituting a third mode of embodiment of the rotary valve according to the present invention.

Hereafter, a ball valve, which constitutes a second embodiment of the rotary valve according to the present invention, is described with reference to FIG. 7.

In the second embodiment, with the exception of the locking member 19, the structure of the rotary valve according to the present invention is the same as the first embodiment, and the same elements are indicated by identical reference numerals.

In this embodiment, 19 is an ABS locking member. A through hole 26 is provided at the rotational center thereof and, as centered on the through hole 26, in one radial direction, a substantially L-shaped hook part 20 is integrally provided, while in another radial direction a lever 23 is integrally provided. A protrusion 21 is provided on the hook part 20, and a detachment preventing flange 22 extends from the bottom thereof. In addition, a flat spring 27, which is made from resin, is integrally formed at a position opposite the hook 20, the end of which engages in the bottom of the grip portion of the handle 1. A securing hole 24 is provided on the lever 23 and a no-latch hole 25 is provided at a position opposite the securing hole 24. The locking member 19 is fastened, by an ABS pin 3, which passes through the through-hole 26, on the bottom face of the grip portion of the handle 1, so as to be pivotably supported on the handle 1.

In this embodiment, a notch 6 is provided in the top flange 5, while a protrusion 21 is provided on the locking member 19, so that these engage; but a protrusion may be provided on the top flange 5, while a notch is provided on the locking member 19, so that these engage.

The operation of the rotary valve in this embodiment is the same as in the first mode of embodiment and therefore no description is given.

As described above, the degree of aperture is fixed by the locking mechanism, whereby it is possible to avoid misoperation. Furthermore, using the same valve body, it is possible to convert the valve to one having a locking mechanism or to one without a locking mechanism, simply by replacing the handle alone. Furthermore, if the biasing member is integral with the locking member, the number of parts can be reduced, which is advantageous in terms of manufacturing costs and ease of assembly.

Embodiment 3

Hereafter, a three-way ball valve, which constitutes a third embodiment of the rotary valve according to the present invention, is described with reference to FIG. 8 through FIG. 15.

In the third embodiment, the rotary valve according to the present invention has a three-way ball valve structure, with openings provided to the right, to the left and to the bottom of the valve body 28. A spherical valve element 29 is provided within the valve body 28, and the valve element 29 is provided with a flow path having a 90° bend. Other than this, the configuration is the same as in the first embodiment, and therefore no description is given. Note that, elements that are the same as in the first embodiment are indicated by identical reference numerals.

Next, the operation of the rotary valve in this embodiment is described.

Figure 9:
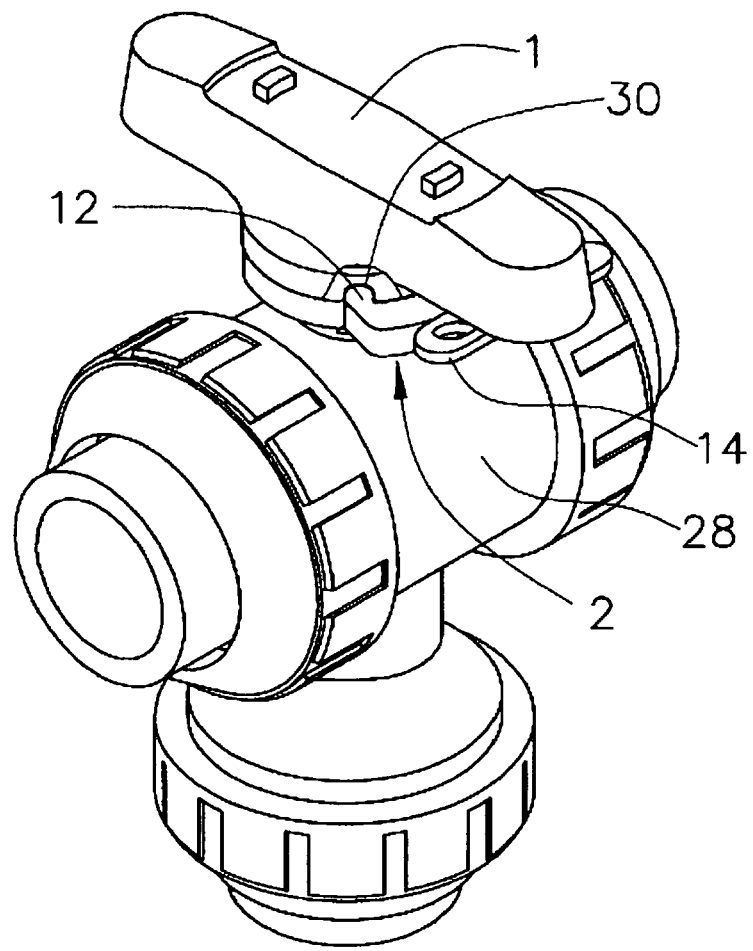
FIG. 9 is a perspective view showing the third mode of embodiment in the locked state, when fully closed.
Figure 10:
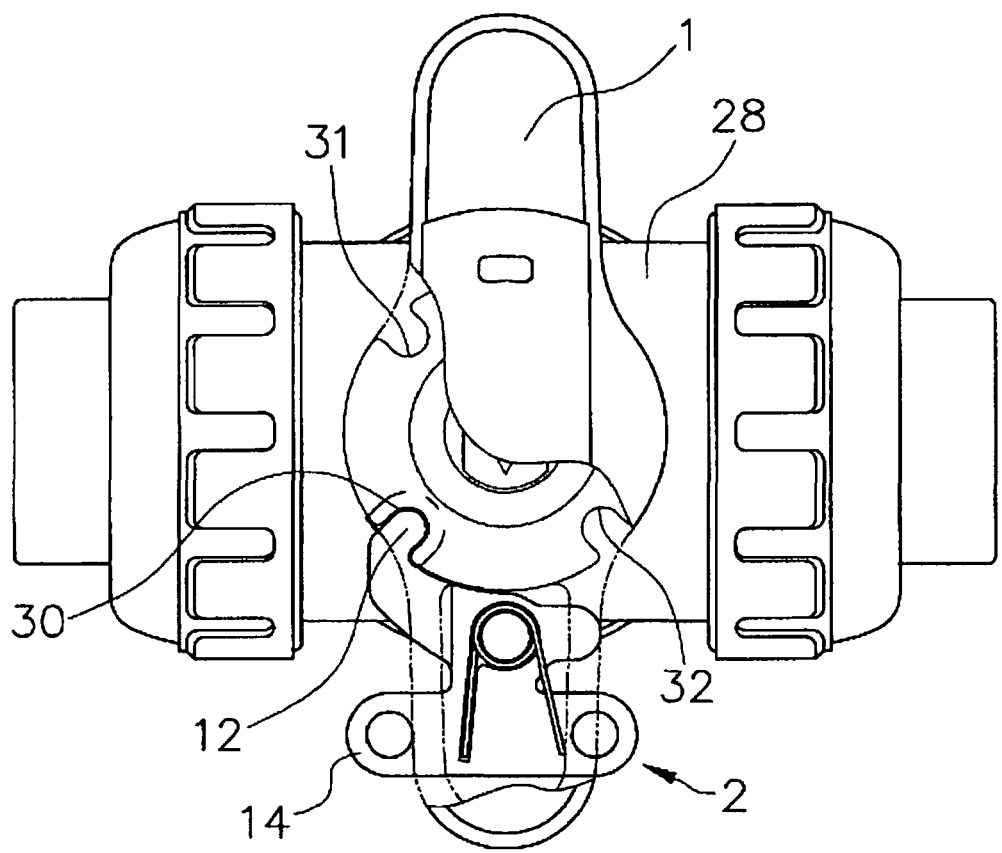
FIG. 10 is a plane view showing the third mode of embodiment in the locked state.
Figure 11:
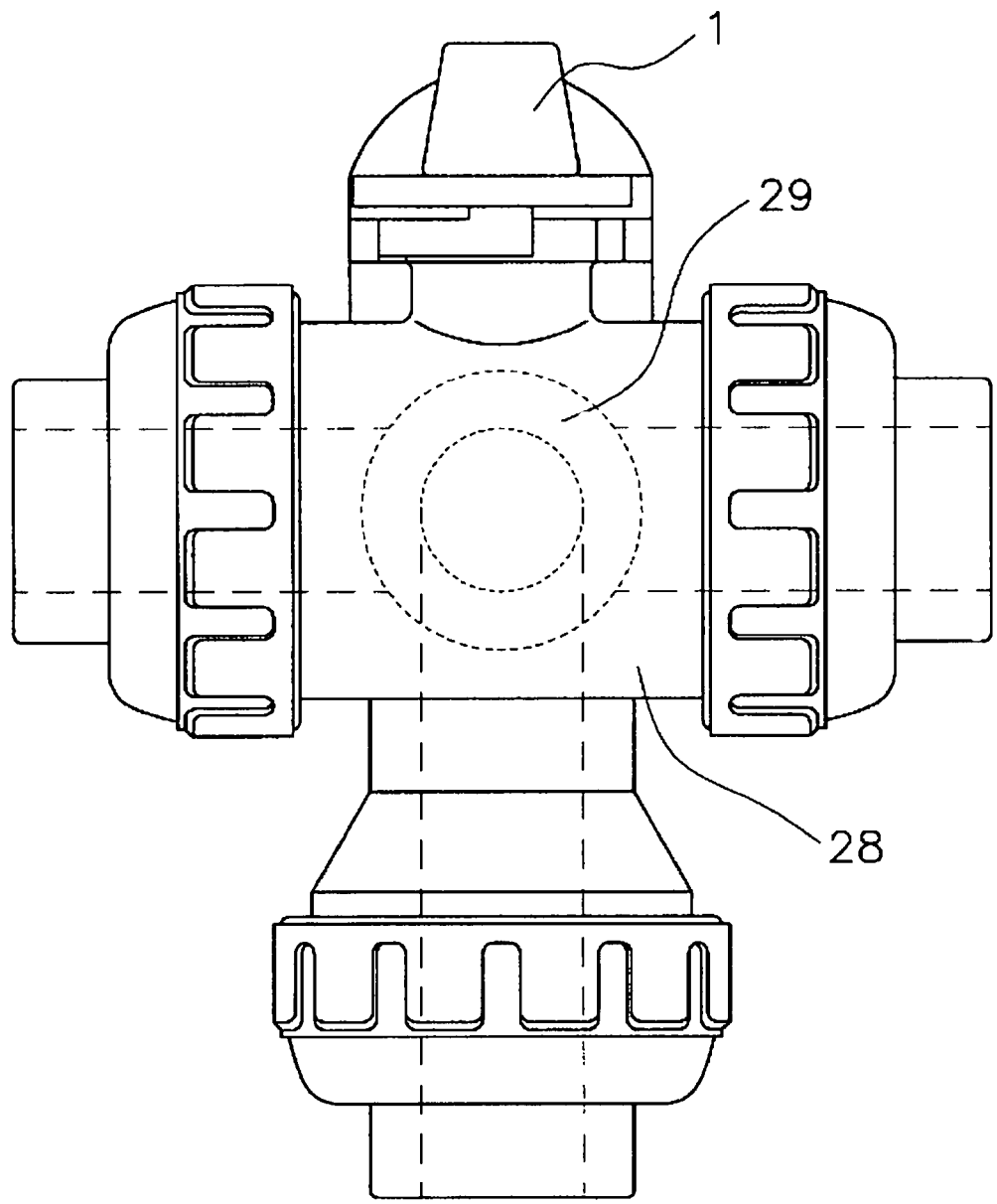
FIG. 11 is a front view illustrating the fluid flow in FIG. 10.
Figure 12:
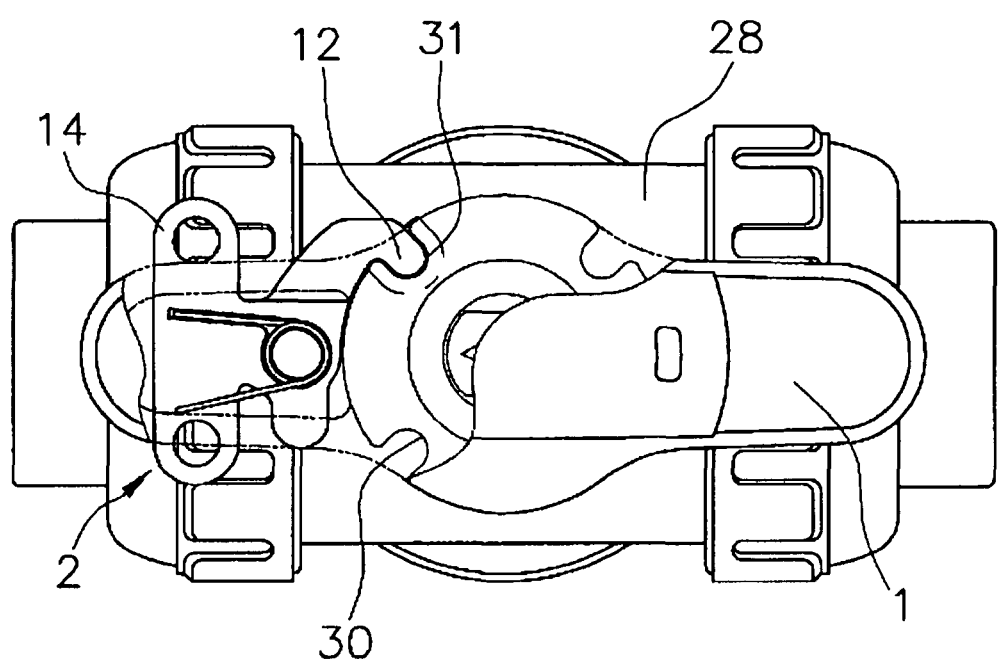
FIG. 12 is a plane view showing the handle in FIG. 10 when rotated 90° to the right, in the locked state.

FIG. 9 and FIG. 10 show a situation in which the handle 1 is locked with the rotary valve closed. In this state, the handle 1 is locked, because the protrusion 12 on the locking member 2 is engaged in the notch 30 on the top flange 5 (see FIG. 10). At this point, the valve element 29 does not communicate with the openings to the left or to the right, but only communicates with the opening to the bottom, so that the flow of a fluid in the rotary valve is stopped (see FIG. 11). Because the valve can be confirmed to be accurately positioned in the closed position, it is possible to prevent downstream leakage of the fluid resulting from misalignment with the closed position.

Figure 13:
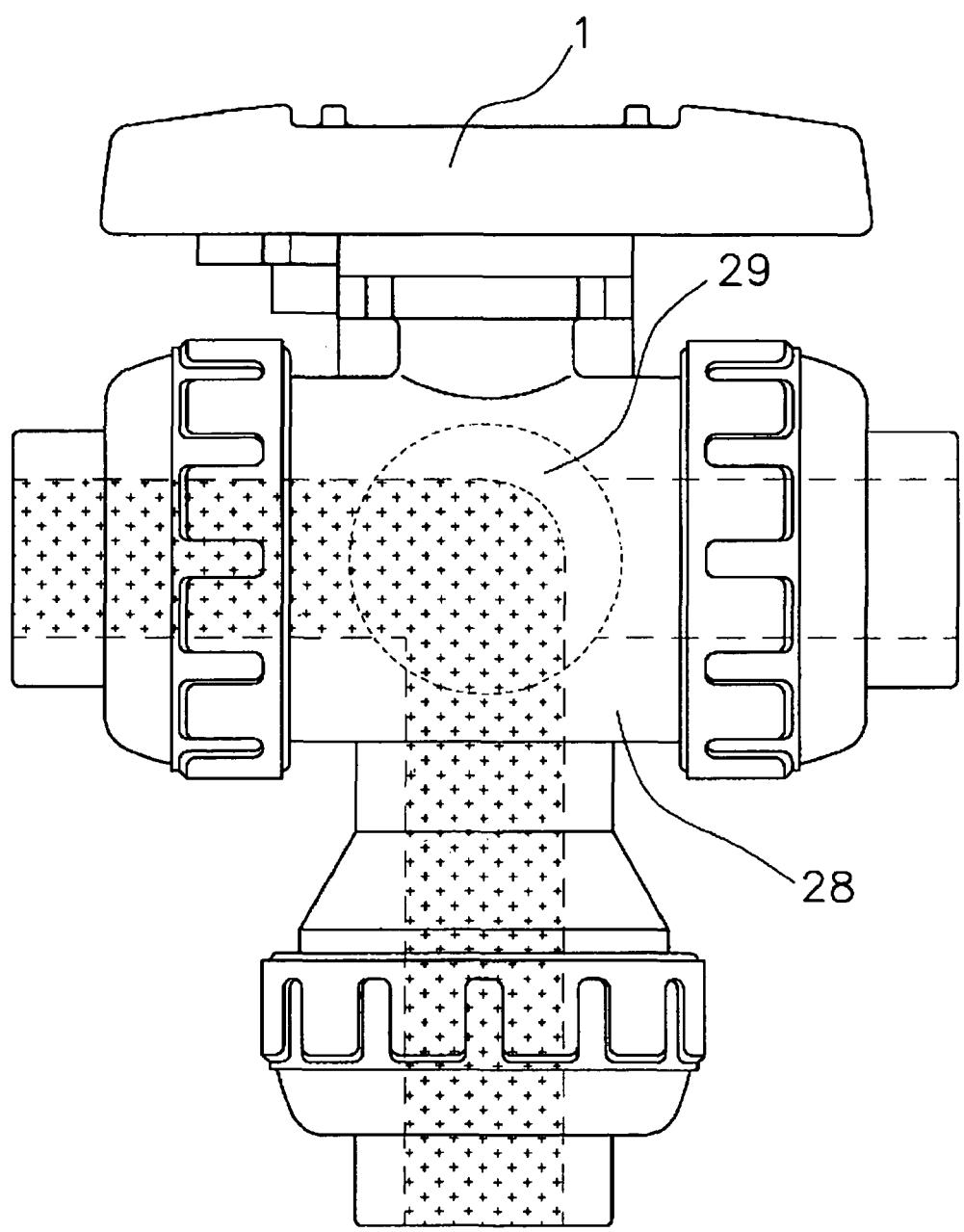
FIG. 13 is a front view illustrating the fluid flow in FIG. 12.
Figure 14:
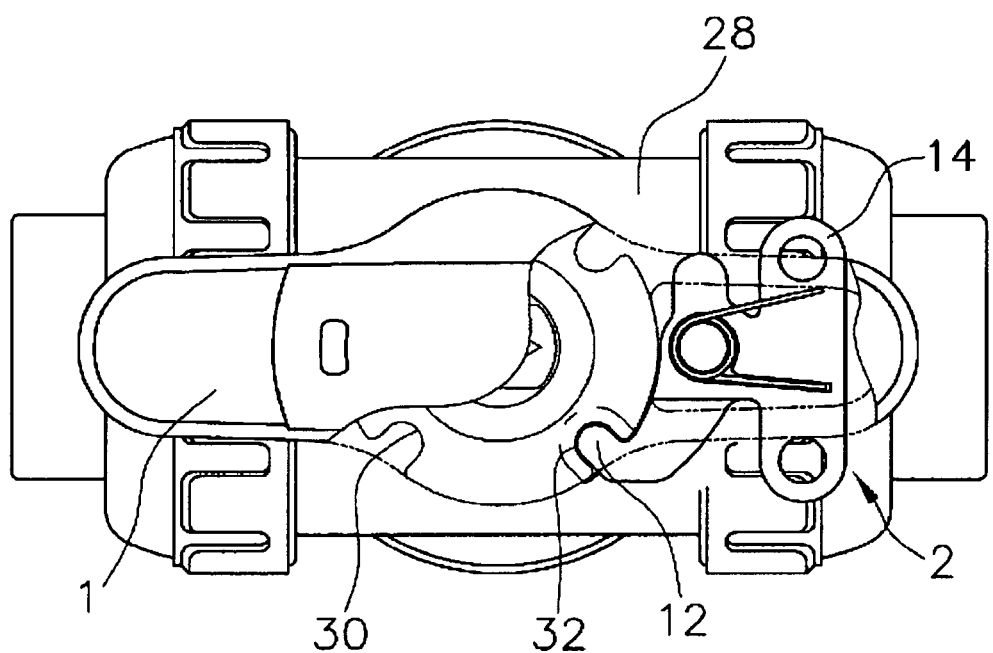
FIG. 14 is a plane view showing the handle in FIG. 10 when rotated 90° to the left, in the locked state.

Starting from the situation shown in FIG. 10, if the lever 14 on the locking member 2 is pushed so as to turn counterclockwise around the pin 3, so that the protrusion 12 of the locking member 2 on the handle 1, which is engaged in the notch 30, is disengaged from the notch 30, and then the handle is rotated to the right by a central angle of approximately 90°, the valve element 29 allows the opening to the bottom and the opening to the left to communicate, so that the fluid can flow (see FIG. 13). Thereafter, if the lever 14, which is being pressed, is released, the protrusion 12 on the locking member 2 moves to, and engages with, the notch 31, which is adjacent to the notch 30 in the direction of clockwise rotation, so that the handle 1 is locked in a state wherein the rotary valve allows the openings to the bottom and to the left to communicate (a state shown in FIG. 12). At this point, communicating flow path switching can be maintained locked at reliable switching positions, and it is possible to prevent the handle 1 from being misaligned with the switching position.

Figure 15:
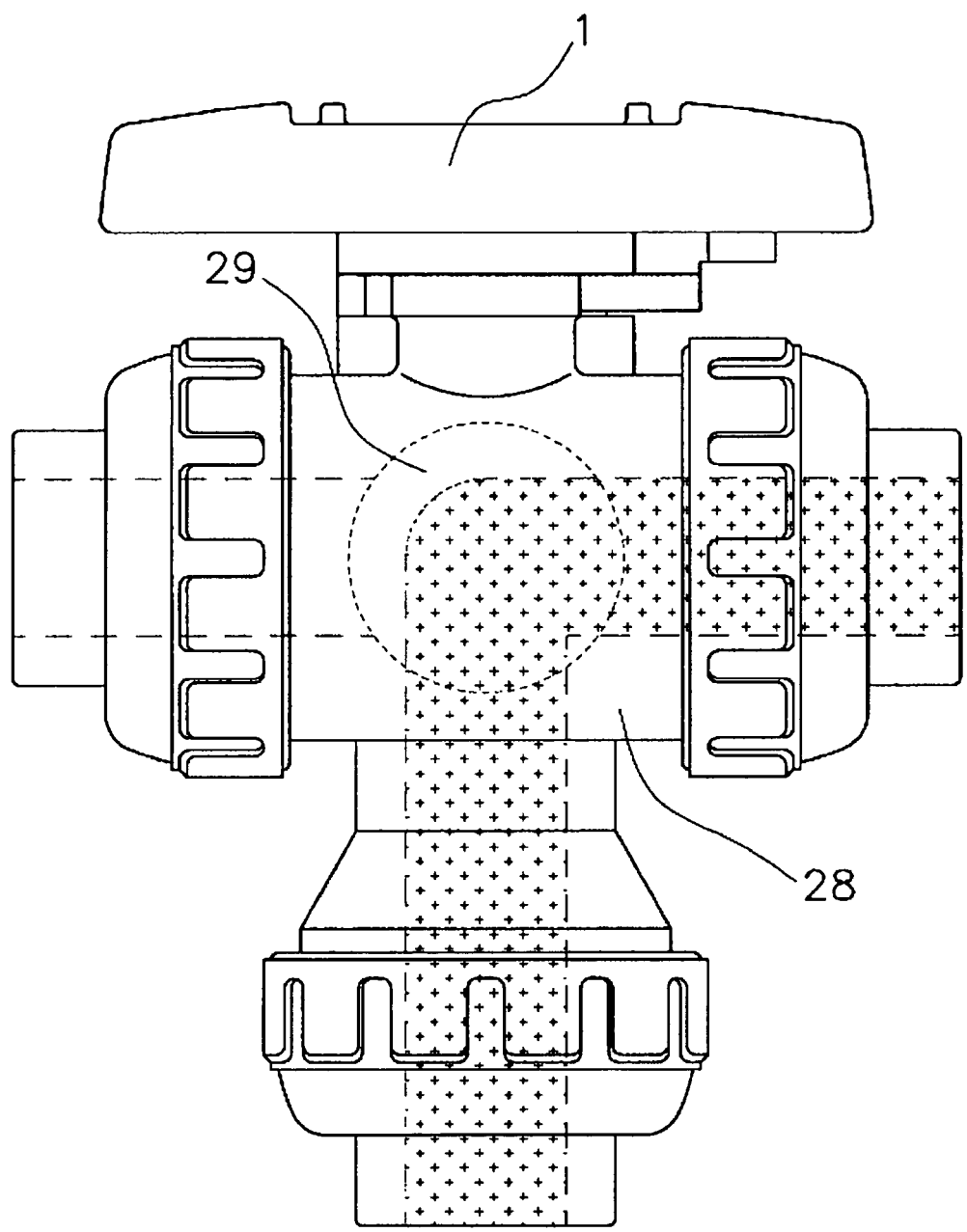
FIG. 15 is a front view illustrating the fluid flow in FIG. 14.

Furthermore, starting from the situation shown in FIG. 10, if the lever 14 on the locking member 2 is pushed so as to turn counterclockwise around the pin 3, so that the protrusion 12 on the locking member 2 on the handle 1, which is engaged in the notch 30, is disengaged from the notch 30, and then the handle is rotated to the left by a central angle of approximately 90°, the valve element 29 allows the opening to the bottom and the opening to the right to communicate, so that the fluid can flow (see FIG. 15). Thereafter, if the lever 14, which is being pressed, is released, the protrusion 12 on the locking member 2 moves to, and engages with, the notch 32, which is adjacent to the notch 30 in the direction of counterclockwise rotation, so that the handle 1 is locked in a state wherein the rotary valve allows the openings to the bottom and to the right to communicate (see FIG. 14).

At this point, communicating flow path switching can be maintained locked at reliable switching positions, and it is possible to prevent the handle 1 from being misaligned with the switching position.

Thus, while valves having three or more switching positions allowed the handle to be freely rotated without the angle of rotation being maintained in any particular manner, so that workers positioned the handle at approximate switching positions, which was an inexact method, by using the locking mechanism of this embodiment to align the handle locking position with the open or closed position of the valve, or the switching position of the valve, the handle switching positions can be made exact, and the degree of aperture can be locked at exact switching positions. In particular, through grooves for the actuator fastening bolts are provided at four positions on the top flange 5, at each 90° of central angle, so that, if the switching positions for the handle are, for example, at central angles of 0°, 90° and 180°, without any work being performed on an existing rotary valve, the through grooves can be used as the notches that serve as the latch receiving parts.

By further providing an additional notch between two adjacent notches 30, 31, the rotary valve can be maintained at exact switching positions, with handle switching positions at central angle intervals of 45°. The operation is otherwise the same as in the first embodiment and, therefore a description is not given.

Embodiment 4

Figure 17:
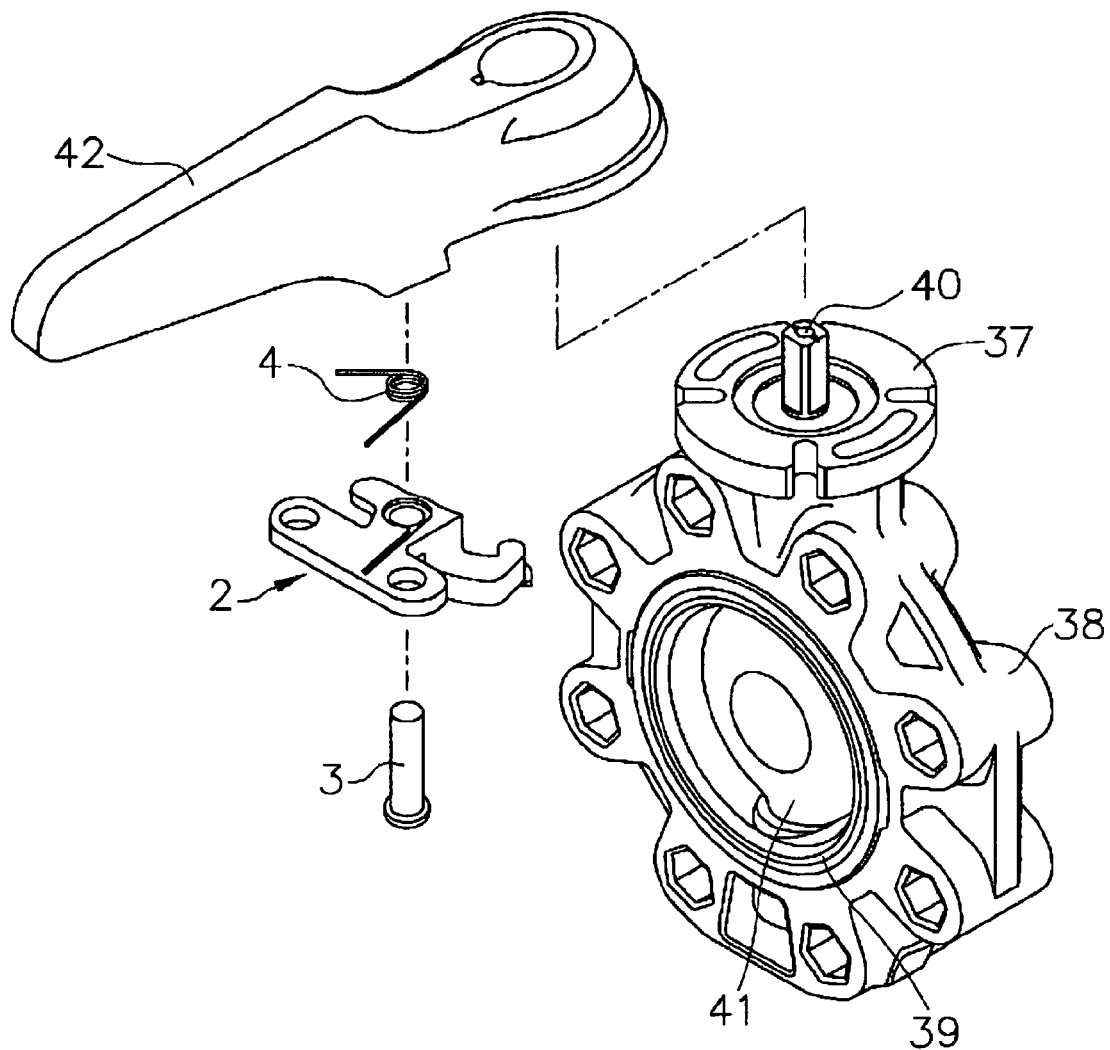
FIG. 17 is an exploded perspective view of a butterfly valve constituting a fourth mode of embodiment of the rotary valve according to the present invention.
Figure 18:
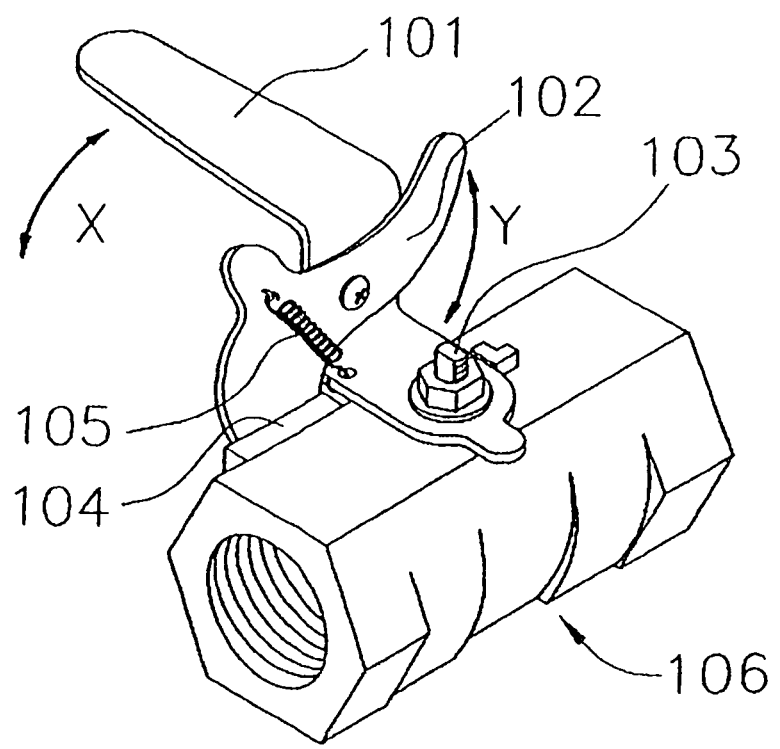
FIG. 18 is a perspective view of a conventional rotary valve.
Figure 19:
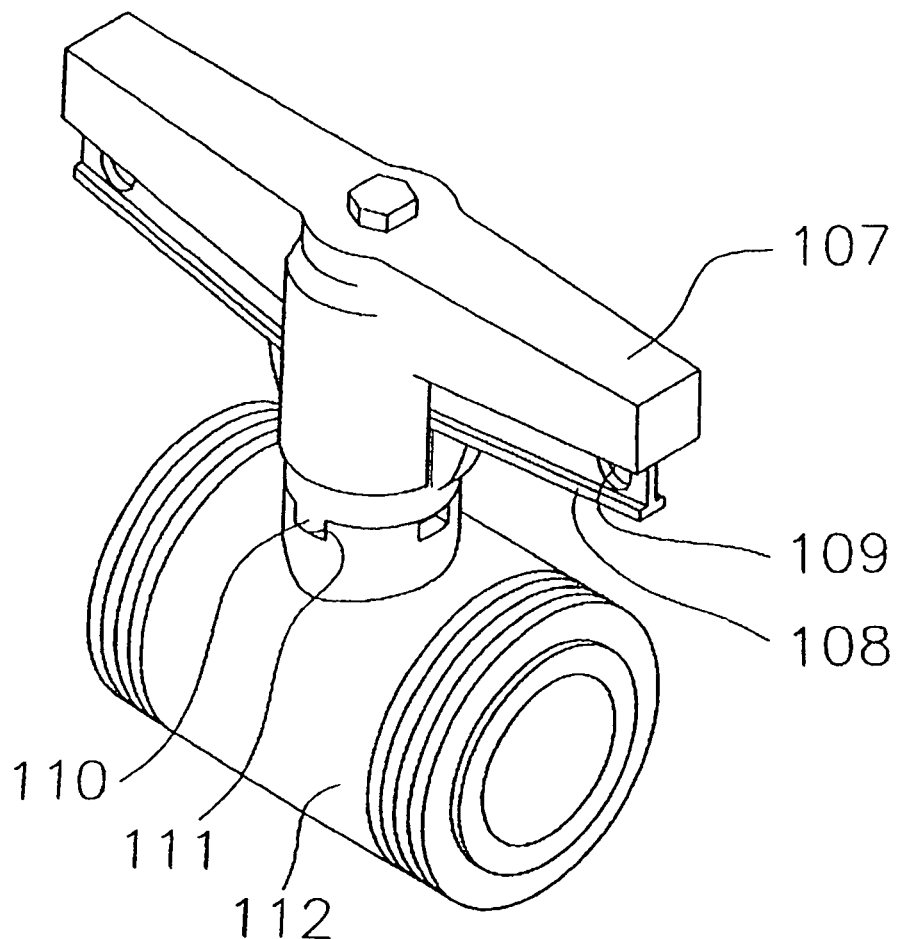
FIG. 19 is a perspective view of a conventional rotary valve.

Next, a butterfly valve, which constitutes a fourth embodiment of the rotary valve according to the present invention, is described with reference to FIG. 17.

In the fourth embodiment, the rotary valve of the present invention is a butterfly valve comprising a hollow cylindrical valve body 38, provided with a top flange 37 on the neck, a sheet ring 39 fitted to the inner circumferential face of the valve body 38, a stem 40, which passes through the sheet ring 39, and is supported by the valve body 38, and a discoid valve element 41, which is supported by the stem 40, and which is opened and closed by turning the valve element 41 by way of turning the stem 40, which is connected to the handle 42, and having a configuration wherein the locking member 2 is fastened to the handle 42 of the butterfly valve by way of the pin 3, so that the locking member 2 can be biased by the torsion spring 4. The configuration is otherwise the same as in the first embodiment and therefore a description is not given. The operation is also the same in cases where the rotary valve is configured as a butterfly valve, and therefore a description is not given.

The present invention has the structure described above, and provides the following extremely beneficial effects.

By locking the handle, it is possible to reduce misoperation resulting from unintentionally pushing against the handle with a hand or an object.

Because the locking mechanism is compact and requires little space, the valve can be used without this impeding the turning of the handle, even when mounted in a small space.

If through grooves are provided for the bolts that fasten an actuator to the top flange, the valve can be converted to a rotary valve having a handle locking mechanism, simply by replacing the handle alone, without detaching the valve body from the line on which it has been installed, which also allows for safe and economical use on existing pipework lines.

In rotary valves having at least three flow paths, the opening and closing of the valve and the switching of the communicating flow paths can be maintained locked at reliable switching positions, and workers can be prevented from aligning the handle at inaccurate switching positions.

By securing the valve, it is also possible to prevent misoperation arising from misunderstanding on the part of a worker or mischief on the part of unwanted persons.

Because the handle cannot be detached when the valve is secured, it is possible to prevent mischief and the like.

Because the valve can also be maintained in a state in which locking is not possible, the valve can also be operated in the same manner as an ordinary valve that does not have a locking mechanism.

Because the size and the mounting position of the handle are no different from those of existing handles, the installation location does not require particular consideration, and because the valve body can be used in combination with existing products, cost reductions can also be achieved.

The invention claimed is:

1. A rotary valve and assembly therefor comprising a valve element engaged with a stem, a rotary valve actuator for actuating the valve element and the stem so as to operate the valve as an automatic valve, a handle directly connected to a top of the stem and directly seated on the stem at a center of the handle so as to operate the valve as a manual valve, said handle comprising said center and a grip portion, said stem being turnable so as to open and close the valve so as to provide open and closed positions thereof, a valve body having a neck and supporting said stem, said neck being integrally formed with the valve body, said neck defining a circumferential top flange integrally formed therewith and extending circumferentially from the neck in a plane that is normal to a vertical axis of the stem and in which said top flange comprises at least two through grooves circumferentially disposed throughout said top flange, each through groove being a receptacle for containing a bolt for mounting said actuator to said top flange and said stem when said handle is not connected to said stem and said valve is operable as an automatic valve through use of said actuator, a latch receiving part being formed at a side periphery of said top flange and each of said through grooves being formed as a groove that passes vertically through said periphery of said top flange so as to form said latch receiving part when said handle is connected to said stem and said valve is operable as a manual valve through use of said handle, a locking member having a latch part pivotably supported-on said grip portion of said handle for locking the valve in said open or closed position, and a biasing member effecting latching of said latch part in said latch receiving part, latching of said latch part of said locking member defining a latched position of said locking member that occurs when said locking member is turned in a horizontal direction that is oriented in a plane that is normal to the vertical axis of said stem so as to engage said latch part at a side periphery of at least one of said through grooves and as such thereagainst a portion of the top flange adjacent the at least one through groove in which said engagement of said latch part locates said latch part along said plane that is normal to the vertical axis of said stem so as to provide said locking of said respective open and closed positions of said rotary valve, said latched position substantially occurring without movement of the locking member in a vertical direction that is parallel to said vertical orientation of said stem, said through grooves being free of said latch part in an unlatched position of said locking member.

2. A rotary valve having at least three flow paths and assembly therefor comprising a valve element engaged with a stem, a rotary valve actuator for actuating the valve element and the stem so as to operate the valve as an automatic valve, a handle directly connected to a top of the stem and directly seated on the stem at a center of the handle so as to operate the valve as a manual valve, said handle comprising said center and a grip portion, said stem and said valve element being turnable so as to open and close the valve so as to provide open and closed positions thereof and/or switch communication of the flow paths, a valve body having a neck and supporting said stem, said neck being integrally formed with the valve body and said neck defining a circumferential top flange integrally formed therewith and extending circumferentially from the neck in a plane that is normal to a vertical axis of the stem and in which said top flange comprises at least two through grooves circumferentially disposed throughout the top flange, each through groove being a receptacle for containing a bolt for mounting said actuator to said top flange and said stem when said handle is not connected to the stem and said valve is operable as an automatic valve through use of said actuator, a latch receiving part being formed at a side periphery of said top flange and each of said through grooves being formed as a groove that passes vertically through said periphery of said top flange so as to form said latch receiving part when said handle is connected to said stem and said valve is operable as a manual valve through use of said handle, and a locking member having a latch part pivotably supported on said grip portion of said handle for locking the valve in said open or closed position, and a biasing member effecting latching of said latch part in said latch receiving part, latching of said latch part of said locking member defining a latched position of said locking member that occurs when said locking member is turned in a horizontal direction that is oriented in a plane that is normal to said vertical axis of said stem so as to engage said latch part at a side periphery of at least one of said through grooves and as such thereagainst a portion of the top flange adjacent the at least one through groove in which said engagement locates said latch part along said plane that is normal to the vertical axis of said stem so as to provide said locking of said respective open and closed positions of said rotary valve, said latched position substantially occurring without movement of the locking member in a vertical direction that is parallel to said vertical orientation of said stem, said through grooves being free of said latch part in an unlatched position of said locking member.

3. The rotary valve of claim 1 or 2, wherein the biasing member is integral with or fastened to the locking member.

4. The rotary valve of claim 1 or 2, wherein the biasing member comprises a spring.

5. The rotary valve of claim 1 or 2, wherein said locking member is positioned beneath a bottom face of said handle and engagement of said latch part in said latch receiving part occurs upon said locking member being turned in a horizontal direction that is parallel to a turning direction of said handle, and a lever is provided integrally with said locking member so as to be positioned beneath said bottom face of said handle, the lever protruding to a position exterior to a lateral face of the handle when the latch part is engaged in the latch receiving part, and a securing hole is provided in said lever.

6. The rotary valve of claim 4, wherein the spring is a torsion spring, one end of the torsion spring is fitted in the locking member and another end thereof is fitted in the handle, and the torsion spring together with said locking member is pivotably supported on said handle by way of a pin so that the latch part of said locking member engages in the latch receiving part of the top flange as a result of the biasing force of the torsion spring.

7. The rotary valve of claim 4, wherein the spring is a flat spring, said flat spring being integral with the locking member so that the latch part of the locking member engages in the latch receiving part of the top flange as a result of the biasing force of the flat spring.

8. The rotary valve of claim 1 or 2, wherein the biasing member comprises a flat spring that is integral with the locking member and turns in said plane that is normal to said vertical axis of the valve stem so that the locking member engages in the latch receiving part of the top flange as the result of the biasing force of the biasing member.

9. The rotary valve of claim 1 or 2, wherein the rotary valve comprises a spherical or cylindrical valve element, or a butterfly valve.

10. The rotary valve of claim 5, wherein a no-latch hole is provided at a position opposite the securing hole in the lever.

11. The rotary valve recited in claim 1 or 2, further comprising a handle detachment preventing flange extending from a bottom of the latch part and engaging with a bottom face of the top flange.

* * * * *